United States Patent
Fink

(10) Patent No.: US 11,591,061 B2
(45) Date of Patent: Feb. 28, 2023

(54) WATERTIGHT BULKHEAD FOR A BOOM OF AN AIRCRAFT

(71) Applicant: AIRBUS HELICOPTERS DEUTSCHLAND GmbH, Donauwörth (DE)

(72) Inventor: Axel Fink, Donauwörth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 177 days.

(21) Appl. No.: 17/109,485

(22) Filed: Dec. 2, 2020

(65) Prior Publication Data

US 2022/0169361 A1    Jun. 2, 2022

(51) Int. Cl.
*B64C 1/10* (2006.01)
*B64C 27/04* (2006.01)

(52) U.S. Cl.
CPC .............. *B64C 1/10* (2013.01); *B64C 27/04* (2013.01)

(58) Field of Classification Search
CPC .. B64C 1/10; B64C 1/06; B64C 1/061; B64C 27/04
See application file for complete search history.

(56) References Cited

U.S. PATENT DOCUMENTS

| 1,802,835 | A | * | 4/1931 | Roberts | B64C 1/10 52/766 |
| 4,699,336 | A | | 10/1987 | Diamond | |
| 8,033,503 | B2 | * | 10/2011 | Basso | B64C 1/10 52/220.8 |
| 10,676,187 | B2 | * | 6/2020 | Bernhardt | B64C 39/04 |
| 2010/0065685 | A1 | | 3/2010 | Basso | |
| 2013/0001363 | A1 | | 1/2013 | Granado et al. | |

FOREIGN PATENT DOCUMENTS

| EP | 3333072 A1 | 6/2018 |
| WO | 2004076769 A2 | 9/2004 |
| WO | 2004076769 A3 | 5/2006 |

OTHER PUBLICATIONS

European Search Report for European Application No. EP 19400021.2, Completed by the European Patent Office, dated Apr. 29, 2020, 5 pages.

* cited by examiner

*Primary Examiner* — Richard Green
*Assistant Examiner* — Arfan Y. Sinaki
(74) *Attorney, Agent, or Firm* — Brooks Kushman P.C.

(57) ABSTRACT

A boom for an aircraft, and, more particularly, to a tail boom for a helicopter, whereby the tail boom may comprise a watertight compartment and watertight bulkheads. The watertight bulkheads may close at least one end of watertight compartment. Watertight bulkhead may include attachment device, frame, and watertight fabric.

20 Claims, 4 Drawing Sheets

WATERTIGHT BULKHEAD FOR A BOOM OF AN AIRCRAFT

BACKGROUND OF THE INVENTION

(1) Field of the Invention

The present embodiments relate to a boom for an aircraft, and, more particularly, to a tail boom for a helicopter, whereby the tail boom comprises a watertight compartment and a watertight bulkhead that includes a watertight fabric and closes at least one end of the watertight compartment.

(2) Description of Related Art

Aircrafts such as helicopters that operate over water can experience water impact events. For example, emergency situations may arise which require an immediate ditching. Therefore, fitment of emergency equipment such as emergency flotation systems, life rafts, etc. is normally required for aircrafts that operate over water.

In particular, emergency flotation systems prevent that the aircraft capsizes in case of a ditching, thereby enabling the occupants to egress the aircraft safely.

Previous studies on helicopter ditching have shown the potentially significant safety benefit of locating flotation devices on the bottom of the fuselage, as well as high on the fuselage in the vicinity of the main rotor gearbox and in the tail boom. Such additional flotation devices may prevent a total inversion of the helicopter in the event that the existing emergency flotation system is damaged.

Such devices may also ensure the retention of an airspace inside the cabin if the sea is beyond the certified conditions. Moreover, such devices increase flotation unit redundancy. The redundancy is especially needed in the case of survival water impact events where the standard flotation devices are susceptible to damage.

The boom of an aircraft, such as the tail boom of a helicopter, is often divided into several compartments. These compartments are usually separated from each other by bulkheads or other separating walls. Bulkheads may also be used to separate the tail boom from other parts of the aircraft such as the main cabin or the empennage.

Typically, these bulkheads are flat and arranged close to a major structural cut-out ahead or behind a compartment. For example, the bulkheads may be arranged within the transition between a closed section of the tail boom on one side and an open section of the tail boom on the other side.

The structural behavior of the closed section is different than the structural behavior of the open section, especially with regard to the torsional behavior. Hence, the bulkhead is often involved within the overall structural behavior of the tail boom as a function of its stiffness by attracting a load-redistribution function between the closed and open sections. For example, the bulkhead may adopt a primary structural function and be strongly loaded in-plane shear.

Typical bulkheads within the tail boom are essentially flat panels. Usually those bulkheads are made of thin sheet metal (e.g., aluminum) with stiffening stringers or beads. Due to the proximity to the tail rotor, metal constructions are prone to generate cracks and require special design features, reinforcements, and attachments to the tail boom shell.

Due to the flat arrangement, the bulkheads are extremely efficient in redistributing loads between a front closed section and a rear open section of the tail boom. This efficiency is independent of whether the bulkhead is shear resistant (i.e., unbuckled) or whether it operates in a post-buckling mode.

Thin webs may buckle at low load levels but develop a semi-diagonal tension field, thereby keeping a strong load bearing capability. Consequently, the reduction of the web thickness of a flat bulkhead in the tail boom of a helicopter does not diminish its involvement in an overall mechanical behavior of the tail boom structure. As a result, bulkheads have to be typically designed as primary structural parts.

The document WO 2004/076769 A2 describes an internal stiffening member of varying configurations in which the stiffening elements support the skin using a compression-only load path. In the preferred embodiment, the stiffening element has a peripheral edge that is adapted to be press fit into contact with the skin. The stiffening member may be held in place by various retention devices. Another configuration is a slip-in rib having a flange with a peripheral channel in which a filler material is disposed. The rib is inserted into an assembled structural box beam, and the filler material is used to fill any gaps between the slip-in rib and the interior surface of the structural box beam. The filler material is preferably an expandable material, such as an expandable foam-type material. However, in situations where a slip-in rib forms a primary structural rib, the filler material is preferably a structural adhesive or liquid shim material. A solid adhesive or filler would not crush under the clamping forces from fasteners or bolts at localized fitting attachments.

Thus, document WO 2004/076769 A2 discloses contact stiffeners for structural skins and thereby a bulkhead having primarily a structural function inside a tail boom. However, a structural function of the bulkheads may not be desirable since such a structural function involves additional weight, because the bulkheads may require reinforcements mainly to cope with instabilities.

A weight increase within the tail boom, especially in its aft end, is especially disadvantageous since it has a negative impact on the helicopters center of gravity. Moreover, depending on the current mission, it may be desirable to have tail boom structural arrangements with identical performance with and without bulkheads.

In summary, many state-of-the-art booms for aircrafts use bulkheads to separate compartments within the booms and/or the booms from other portions of the aircraft such as a fuselage and/or a rear fin. These bulkheads are usually reinforced to provide for an increased structural stability of the respective booms at the expense of a significant weight increase.

However, sandwich constructions of the tail boom main structure may be by nature stiff enough to assume the load redistribution function between two separate sections of the tail boom. Thus, there may not be a need for a load carrying bulkhead.

BRIEF SUMMARY OF THE INVENTION

It is, therefore, an objective to provide a new tail boom for a helicopter that is suitable to overcome the above-described drawbacks. In particular, the tail boom should include a bulkhead with a pronounced non-structural characteristic. In other words, the bulkhead may be entirely excluded from the overall mechanical behavior of the tail boom. The bulkhead should have a simple and light-weight design, while being compatible with the remaining systems of the helicopter. The bulkhead should also be watertight and close a watertight compartment at least on one side.

The objective is solved by a tail boom comprising the features of claim 1. More specifically, a tail boom for a helicopter may comprise a watertight compartment and a watertight bulkhead. The watertight compartment may have a first end with a first perimeter, a second end with a second perimeter, and a watertight structural hull between the first and second ends. The watertight bulkhead may close the watertight compartment at the first end in a watertight manner and comprise an attachment device that is attached to the watertight compartment along the first perimeter at the first end, a frame with an inner perimeter that is attached to the attachment device, and a watertight fabric that closes the inner perimeter of the frame in a watertight manner.

The bulkhead may be non-structural. In other words, the bulkhead may not need to be involved in the overall structural behavior of the tail boom, despite of being structurally integrated and attached within the tail boom structure. For example, a non-tensioned baggy fabric may be used instead of a rigid panel. The fabric is able to follow the deformation of the structure without being able to develop a diagonal tension field.

In a ditching scenario, the fabric is tensioned as an effect of the hydrostatic pressure acting as a hemispherical membrane and transmitting the water load to its attachment to the structure.

The fabric is loosely spanned within a frame. The frame may be made from aluminum. If desired, the frame may be made from composite material. The frame may enclose the entire border perimeter of the tail boom at the bulkhead location. The frame and the fabric may build the segregation wall subassembly which is conveniently and structurally attached to the tail boom structure. If desired, the frame and the fabric may be attached to the tail boom structure by means of a riveted attachment device. The attachment device is sometimes also referred to as "attachment angle". Illustratively, the attachment angle and the segregation wall may be additionally sealed to each other.

By way of example, the frame may be composed of a first and a second frame. The fabric may be adhesively bonded and sandwiched between the first and second frames. If desired, the first and second frames may be identical.

Illustratively, the frame is flat. If desired, the frame may be made of sheet metal. The sheet metal may be easily and cheaply shaped by means of laser cutting techniques.

The frame may have a low sectional bending stiffness within the plane of the bulkhead in order to avoid a stiffening effect of the frame. For that purpose, the frame may be advantageously scalloped in order to reduce stiffness whilst ensuring an adequate bonding area between the frames and the fabric.

By way of example, the frames may show extensions within the plane of the bulkhead. The extensions within the plane of the bulkhead may provide the perforations, the attachments, and the support required for the integration of connectors and/or other system devices. If desired, these extensions are allocated close to the frame border perimeter.

Illustratively, the membrane may be made of impermeable fabric materials as used for flotation balloons and life rafts. For example, the membrane may include nylon or a Kevlar® (para-aramid) (Dupont®, Wilmington, Del., USA) fabric that is coated with waterproof polymer.

By way of example, such a bulkhead may not impact the stress level of the tail boom structure. Hence, the mechanical working condition of the tail boom structure is independent on whether a bulkhead is installed or not.

Such a non-structural bulkhead may not need inspection or maintenance, especially with respect to cracks on metallic load-carrying structures close to the tail rotor.

The non-structural bulkhead may be light-weight. For example, a non-structural bulkhead may be less than half as heavy as a conventional bulkhead.

The materials that are used for life rafts and flotation balloons are flexible, bondable, robust, and already certified for helicopters for watertight functions.

The suggested design of the watertight bulkhead is simple and cheap to produce.

According to one aspect, the tail boom further comprises an additional watertight bulkhead that closes the watertight compartment at the second end in a watertight manner and comprises an additional attachment device that is attached to the watertight compartment along the second perimeter at the second end, an additional frame with another inner perimeter that is attached to the additional attachment device, and an additional watertight fabric that closes the other inner perimeter of the additional frame in a watertight manner.

According to one aspect, the watertight fabric is bonded to the frame.

According to one aspect, the frame further comprises a first sandwich layer with the inner perimeter; and a second sandwich layer with the inner perimeter, wherein the watertight fabric is sandwiched between the first and second sandwich layers.

According to one aspect, the frame further comprises at least one extension for attaching auxiliary devices.

According to one aspect, the auxiliary devices are selected from the group consisting of pipes, connectors, and harnesses.

According to one aspect, the at least one extension further comprises a plurality of perforations for accommodating the auxiliary devices.

According to one aspect, the frame further comprises at least one of a sheet metal or a composite material.

According to one aspect, the frame is flat and has a uniform thickness.

According to one aspect, the uniform thickness is between 0.5 mm and 1.5 mm.

According to one aspect, the watertight fabric further comprises one or more layers, at least one of the one or more layers comprising at least one of polyurethane laminate, thermoplastic polyurethane, polymer coated nylon, ripstop nylon, nylon taffeta, poly-vinyl chloride (PVC) coated polyester, or Kevlar® (para-aramid) (Dupont®, Wilmington, Del., USA).

According to one aspect, the watertight fabric has a first surface area and the frame has a second surface area, and wherein the first surface area is greater than the second surface area.

According to one aspect, the watertight fabric further comprises an incision that is adapted to provide a flat bonding area of the watertight fabric at the frame without wrinkles and a baggy shaping out of the datum plane of the frame when water is pushing against the watertight fabric.

According to one aspect, the watertight fabric further comprises a patch that closes the incision.

Moreover, a helicopter may comprise a tail boom as described in the previous sections.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
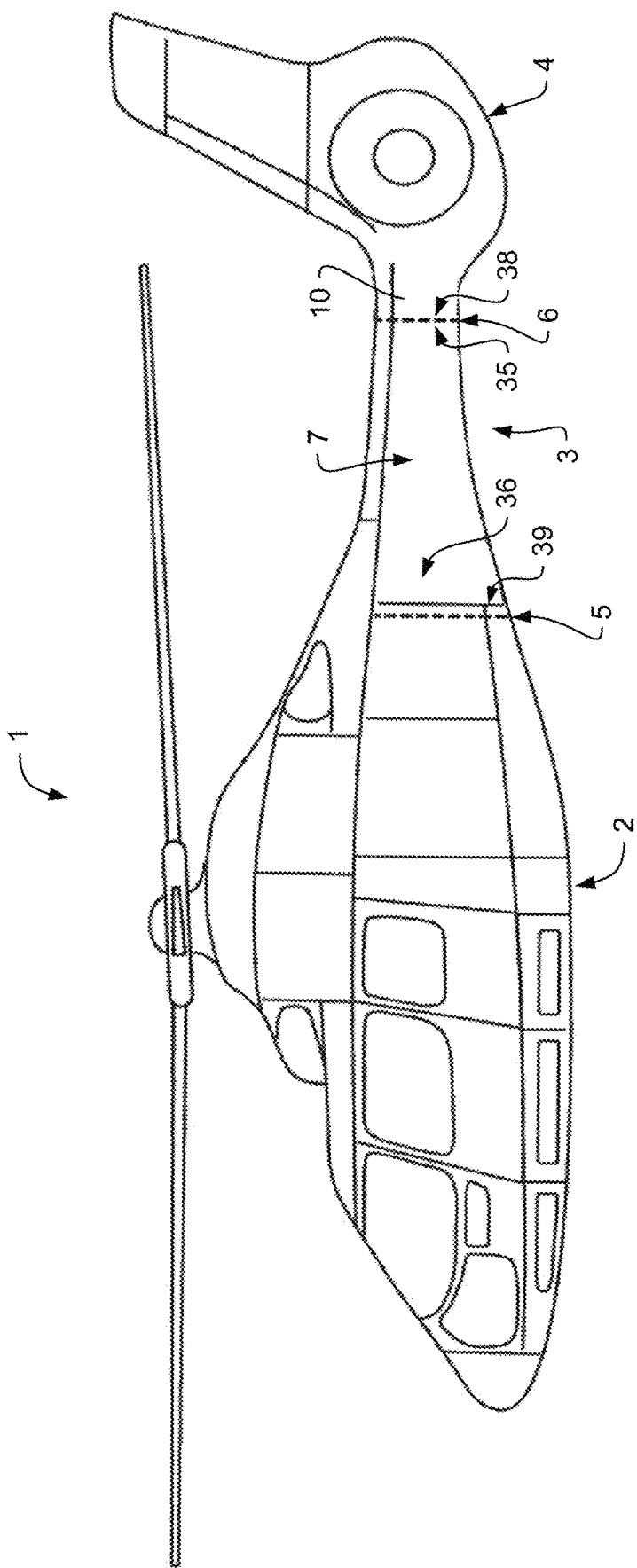
FIG. 1 shows a perspective view of an illustrative aircraft having a tail boom with a watertight compartment and a watertight bulkhead in accordance with some embodiments.

FIG. 1 shows an aircraft 1 that is exemplarily illustrated as a rotary wing aircraft and, in particular as a helicopter. Thus, for purposes of simplicity and clarity, the vehicle 1 is hereinafter referred to as the "helicopter" 1. It should, however, be noted that the present embodiments are not limited to helicopters and can likewise be applied to any other aircraft that comprises one or more booms such as a multi-boom aircraft (e.g., a twin-boom aircraft).

Illustratively, helicopter 1 comprises fuselage 2. Fuselage 2 may be connected to a landing gear. The helicopter 1 further comprises at least one main rotor for providing lift and forward, backward or sideward thrust during operation.

The main rotor is exemplarily embodied as a multi-blade main rotor that comprises a plurality of rotor blades that are mounted at an associated rotor head to a rotor mast, which rotates in operation of the helicopter 1 around an associated rotor axis defined by the rotor mast.

By way of example, the helicopter 1 further comprises tail boom 3 and empennage 4 with a horizontal stabilizer and a fin. The horizontal stabilizer may by located at different positions on the fin and/or on the tail boom 3, if desired.

Illustratively, empennage 4 of helicopter 1 may include a counter-torque device configured to provide counter-torque during operation, i.e., to counter the torque created by rotation of the at least one multi-blade main rotor for purposes of balancing the helicopter 1 in terms of yaw. The at least one counter-torque device is illustratively implemented by a tail rotor at an aft section of the tail boom 3, and therefore also referred to as the "tail rotor" hereinafter. Other helicopter configurations may alternatively have no counter-torque device on the empennage 4.

As shown in FIG. 1, tail boom 3 may include a watertight compartment 7 having a first end 35 with a first perimeter 38 of the hull cross section, a second end 36 with a second perimeter 39 of the hull cross section, and a watertight structural hull, which is sometimes also referred to as an "airframe shell", between the first and second ends 35, 36.

A watertight bulkhead 6 may close watertight compartment 7 at the first end 35 in a watertight manner, thereby separating watertight compartment 7 from non-watertight compartment 10.

Illustratively, watertight bulkhead 6 may include an attachment device. The attachment device may be attached along the first perimeter 38 at the first end 35. If desired, watertight bulkhead may include a frame with an inner perimeter. The frame may be attached to the attachment device.

By way of example, watertight bulkhead 6 may include a watertight fabric. The watertight fabric may close the inner perimeter of the frame in a watertight manner.

Watertight bulkhead 6 may have a pronounced non-structural characteristic. In other words, watertight bulkhead 6 may be entirely excluded from the overall mechanical behavior of tail boom 3.

As shown in FIG. 1, watertight bulkhead 6 is located at the aft section of watertight compartment 7. However, it should be noted that watertight compartment 7 may be closed by a watertight bulkhead that is essentially similar to watertight bulkhead 6 (e.g., watertight bulkhead 5) at the front section of watertight compartment 7 only and at the aft section by a watertight bulkhead that is essentially different than watertight bulkhead 6. Alternatively, watertight compartment 7 may be closed by watertight bulkheads such as watertight bulkheads 5 and 6 at both ends.

For purposes of simplicity and clarity, watertight compartment 7 is hereinafter closed by watertight bulkheads 6 and 5 at the first and second ends 35, 36, respectively. In other words, tail boom 3 may comprise an additional watertight bulkhead 5 that closes the watertight compartment 7 at the second end 36 in a watertight manner. Additional watertight bulkhead 5 may comprise an additional attachment device that is attached to watertight compartment 7 along the second perimeter 39 at the second end 36.

Figure 2:
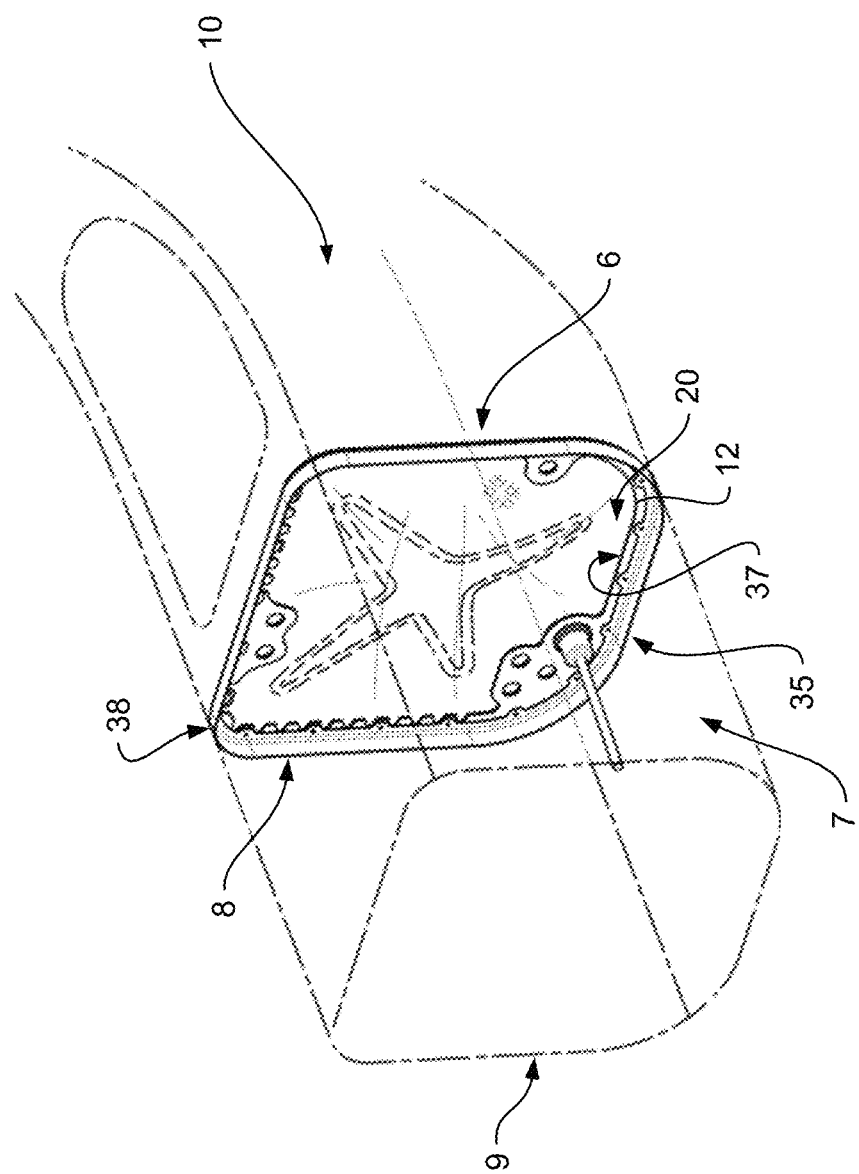
FIG. 2 shows a schematic view of an illustrative bulkhead that separates two compartments of a tail boom in accordance with some embodiments.

FIG. 2 shows a schematic view of an illustrative bulkhead (e.g., watertight bulkhead 5 or 6 of FIG. 1) that separates two compartments of a tail boom in accordance with some embodiments. The illustrative bulkhead of FIG. 2 may implement either one or both of watertight bulkheads 5, 6 of FIG. 1. For purposes of simplicity and clarity, the illustrative bulkhead is hereinafter described with reference to watertight bulkhead 6.

As shown in FIG. 2, watertight bulkhead 6 may close watertight compartment 7 at the first end 35 in a watertight manner, thereby separating watertight compartment 7 from non-watertight compartment 10. In other words, watertight bulkhead 6 may form a segregation wall 20 between compartments 7 and 10.

If desired, an additional watertight bulkhead may close watertight compartment 7 at a second end, and a watertight structural hull 9 may close watertight compartment 7 between the first end 35 and the second end.

For example, a watertight bulkhead (e.g., watertight bulkhead 5 of FIG. 1) may close watertight compartment 7 at the second end (e.g., second end 36 of FIG. 1) in a watertight manner. The watertight bulkhead may include an additional attachment device that is attached to watertight compartment 7 along the second perimeter at the second end (e.g., second perimeter 39 at second end 36 of FIG. 1). An additional frame with another inner perimeter may be attached to the additional attachment device, and an additional watertight fabric may close the other inner perimeter of the additional frame in a watertight manner.

Illustratively, watertight bulkhead 6 may include an attachment device 8. Attachment device 8 may be attached along the first perimeter 38 of the hull cross section at the first end 35. As an example, attachment device 8 may have a cross section that has a T-shaped profile, and the flange of the T-shaped profile may be attached along the first perimeter 38 to the skin of the hull at the first end 35. As another example, attachment device 8 may have a cross section that has an L-shaped profile, and the flange of the L-shaped profile may be attached along the first perimeter 38 at the first end 35.

By way of example, watertight bulkhead may include frame with an inner perimeter 37. Frame 12 may be attached to attachment device 8. In the example in which attachment device 8 has a cross section that has a T-shaped profile, frame 12 may be attached to the web of the T-shaped profile. In the example in which attachment device 8 has a cross section that has an L-shaped profile, frame 12 may be attached to the web of the L-shaped profile (i.e., to the planar side that is coplanar to the section plane of the perimeter 38).

A watertight fabric may close the inner perimeter 37 of the frame 12 in a watertight manner. As an example, the watertight fabric may be bonded to frame 12.

The watertight fabric may comprise one or more layers. At least one of the one or more layers may include at least one of polyurethane laminate, thermoplastic polyurethane, polymer coated nylon, ripstop nylon, nylon taffeta, poly-vinyl chloride (PVC) coated polyester, or Kevlar® (para-aramid) (Dupont®, Wilmington, Del., USA).

Figure 3:
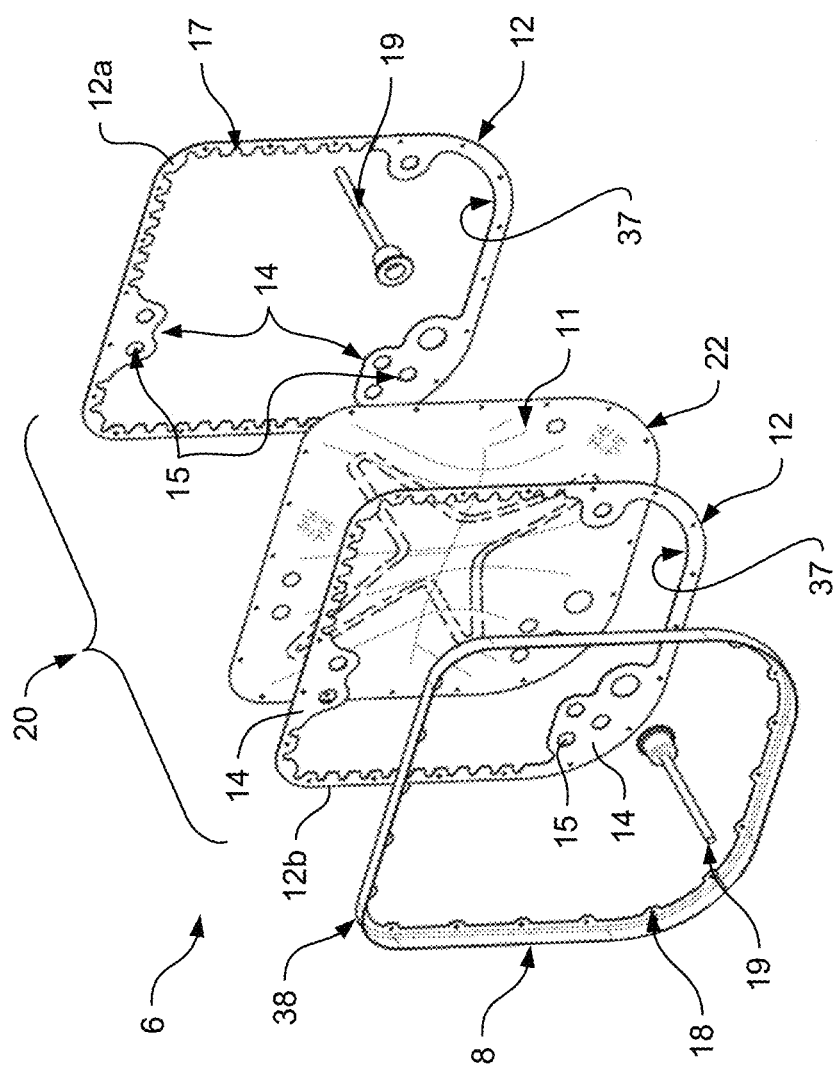
FIG. 3 shows an exploded view of an illustrative bulkhead having a segregation wall and an attachment device in accordance with some embodiments.

FIG. 3 shows an exploded view of an illustrative bulkhead (e.g., watertight bulkhead 5 or 6 of FIG. 1) having a segregation wall 20 and an attachment device 8 in accordance with some embodiments. The attachment device 8 may be attached to the inside of a tail boom (e.g., tail boom 3 of FIG. 2).

The segregation wall 20 may be attached to the attachment device 8 by means of fasteners 18. Any suitable fasteners 18 may attach segregation wall 20 to attachment device 8. Suitable fasteners 18 may include screws, rivets, bolts and nuts, pins, etc. If desired, segregation wall 20 may be bonded (e.g., welded or glued) to attachment device 8.

The segregation wall 20 may include frame 12 and watertight fabric 11. If desired, watertight fabric 11 may be bonded to frame 12. Watertight fabric 11 may be flabby and not tensioned.

Watertight fabric 11 may include one or more layers. The one or more layers may be free to move relative to each other. If desired, at least some layers of the one or more layers may be stitched or bonded together. At least one of the one or more layers may comprise at least one of polyurethane laminate, thermoplastic polyurethane, polymer coated nylon, ripstop nylon, nylon taffeta, poly-vinyl chloride (PVC) coated polyester, or Kevlar® (para-aramid) (Dupont®, Wilmington, Del., USA).

By way of example, frame 12 may include first and second sandwich layers 12a, 12b that both have inner perimeter 37. First and second sandwich layers 12a, 12b may overlap with each other at least along the inner perimeter 37.

In some embodiments, sandwich layers 12a, 12b may be identical to each other. In other embodiments, sandwich layers 12a and 12b may be mirror images of each other when seen from out of the datum plane of sandwich layers 12a and 12b (e.g., from the inside of the watertight compartment).

Frame 12 may include at least one of a sheet metal or a composite material. In other words, either one of sandwich layers 12a, 12b may be made of a sheet metal or a composite material. As an example, both sandwich layers 12a, 12b may be made of a sheet metal, or both sandwich layers 12a, 12b may be made of a composite material. As another example, one of sandwich layers 12a or 12b may be made of a sheet metal, while the other one is made of a composite material. If desired, sandwich layer 12a and/or sandwich layer 12b may include both, a sheet metal and a composite material.

Illustratively, frame 12 may include at least one extension 14 for attaching auxiliary devices 19. The at least one extension 14 may protrude inside frame 12 from inner perimeter 37. If desired, the at least one extension 14 of frame 12 may include a plurality of perforations 15.

The plurality of perforations 15 may have any shape. As an example, some perforations of the plurality of perforations 15 may be round. As another example, some perforations of the plurality of perforations 15 may have a polygonal shape. If desired, all perforations of the plurality of perforations 15 may have the same shape.

The plurality of perforations 15 may have any size. As an example, some perforations of the plurality of perforations 15 may have a first perimeter, while other perforations of the plurality of perforations 15 may have a second perimeter that is different than the first perimeter. If desired, all perforations of the plurality of perforations 15 may have the same perimeter.

The plurality of perforations 15 may accommodate the auxiliary devices 19. The auxiliary devices 19 may include any devices that are suitable to be attached to frame 12. As an example, the auxiliary devices 19 may be selected from the group consisting of pipes, connectors, and harnesses. For the simplicity of the representation, only connectors 19 are shown in FIG. 3.

Watertight fabric 11 may be sandwiched between the first and second sandwich layers 12a, 12b. For example, watertight fabric 11 may overlap at the border perimeter of the watertight fabric 22 with both sandwich layers 12a, 12b along the inner perimeter 37, thereby defining an overlap region with sandwich layers 12a, 12b. Watertight fabric 11 may be bonded with both sandwich layers 12a, 12b at the overlap region.

To provide for a sufficient bonding surface, first and second sandwich layers 12a, 12b may have protrusions 17 around the inner perimeter 37. For example, sandwich layers 12a, 12b may have at least partially a scalloped edge around the inner perimeter 37.

Illustratively, watertight fabric 11 may have the same plurality of perforations with the same size and shape as the plurality of perforations 15 of frame 12. The plurality of perforations of watertight fabric 11 may overlap with the plurality of perforations 15 of frame 12 when the watertight fabric 11 is bonded to frame 12.

By way of example, frame 12 may be flat. In other words, sandwich layers 12a and 12b may be flat when put together. Frame 12, and thus sandwich layers 12a and 12b when put together, may have a uniform thickness. As an example, the uniform thickness may be between 0.5 mm and 1.5 mm.

If desired, either one or both of sandwich layers 12a or 12b may have protrusions and/or recessions on either one or both surfaces, which may lead to a non-uniform thickness of frame 12.

As an example, sandwich layers 12a and 12b may be flat on the respective surfaces that receive watertight fabric 11. As another example, sandwich layers 12a and/or 12b may have protrusions and/or recessions on the respective surfaces that are oriented away from watertight fabric 11. For example, sandwich layers 12a and/or 12b may have protrusions and/or recessions around at least some of the plurality of perforations 15.

Figure 4:
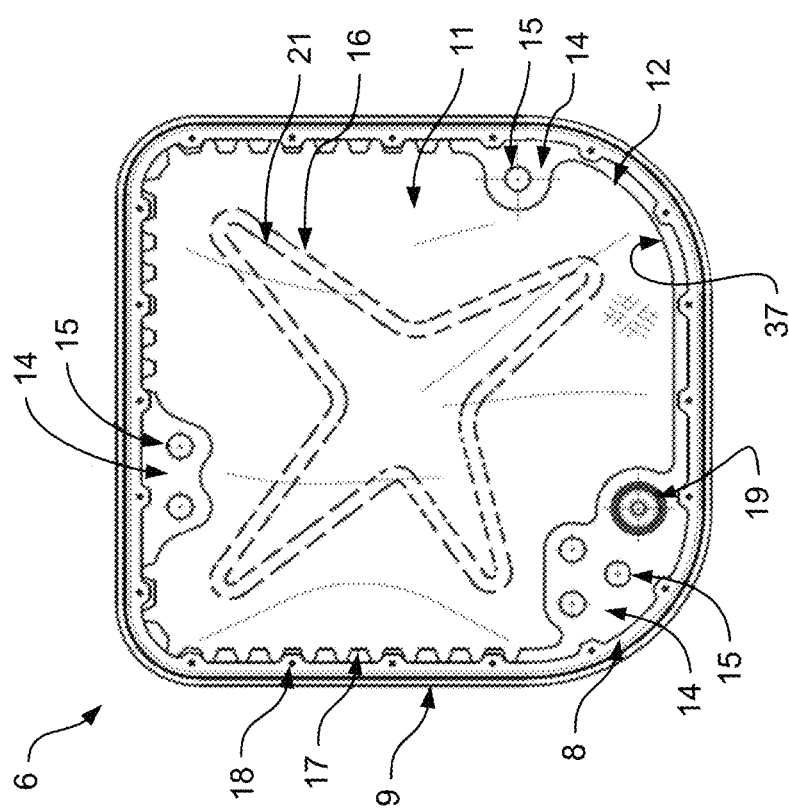
FIG. 4 is a diagram of the illustrative bulkhead of FIG. 3 seen from one side in accordance with some embodiments.

FIG. 4 is a diagram of the illustrative bulkhead of FIG. 3 seen from one side in accordance with some embodiments. As shown in FIG. 4, frame fasteners 18 attach frame 12 to attachment device 8. Watertight fabric 11 may be bonded to frame 12.

Illustratively, perforations 15 in frame 12 and watertight fabric 11 may be aligned to allow the passing through of connectors 19.

By way of example, the watertight fabric 11 may have a first surface area and the frame 12 a second surface area. The first surface area may be greater than the second surface area.

In the scenario in which the first surface area is greater than the second surface area, watertight fabric 11 may include an incision 21. Incision 21 may be adapted to provide a flat bonding area of the watertight fabric 11 at the frame 12 without wrinkles and a baggy shaping out of the datum plane of the frame 12 (i.e., an out-of-plane shaping out towards the inside of the watertight compartment) when water is pushing against the watertight fabric 11.

In other words, watertight fabric 11 may be slotted in several directions so that the slot opens to incision 21. Illustratively, the watertight fabric 11 may include a patch 16 that closes incision 21.

It should be noted that modifications to the above described embodiments are within the common knowledge of the person skilled in the art and, thus, also considered as being part of the present invention.

For instance, helicopter 1 of FIG. 1 is shown with a single watertight compartment 7 that is closed by watertight bulkheads 5 and 6 in tail boom 3. However, helicopter 1 may have more than one watertight compartment, each of which being delimited by watertight bulkheads such as watertight bulkheads 5 and 6.

Furthermore, the watertight compartment 7 of FIG. 1 is limited to a compartment located in tail boom 3. However, such a watertight compartment may be located anywhere on the fuselage of helicopter 1.

Moreover, watertight bulkhead 6 of FIGS. 2 to 4 is shown with a mostly rectangular shape. However, watertight bulkhead 6 may have any shape, if desired. For example, watertight bulkhead 6 may be round or have a polygonal shape.

Furthermore, watertight bulkhead 6 of FIGS. 2 to 4 is shown with three extensions 14. However, watertight bulkhead 6 may have any number of extensions. For example, watertight bulkhead 6 may have one, two, four, or more extensions. If desired, watertight bulkhead 6 may have no extensions.

REFERENCE LIST 1 helicopter
2 fuselage
3 tail boom
4 empennage
5, 6 watertight bulkhead
7 watertight compartment
8 attachment device
9 airframe shell, watertight structural hull
10 non-watertight compartment
11 watertight fabric
12 frame
12a, 12b sandwich layer
14 extension
15 perforation
16 patch
17 protrusion
18 frame fasteners
19 connector, auxiliary device
20 segregation wall
21 incision
22 border perimeter of the watertight fabric
35 first end
36 second end
37 inner perimeter
38 first perimeter
39 second perimeter

What is claimed is:

1. A tail boom for a helicopter, comprising:
   a watertight compartment having a first end with a first perimeter, a second end with a second perimeter, and a watertight structural hull between the first and second ends; and
   a watertight bulkhead that closes the watertight compartment at the first end in a watertight manner and comprises:
   an attachment device that is attached to the watertight compartment along the first perimeter at the first end,
   a frame with an inner perimeter that is attached to the attachment device, and
   a watertight fabric that closes the inner perimeter of the frame in a watertight manner.

2. The tail boom of claim 1, further comprising:
   an additional watertight bulkhead that closes the watertight compartment at the second end in a watertight manner and comprises:
   an additional attachment device that is attached to the watertight compartment along the second perimeter at the second end,
   an additional frame with another inner perimeter that is attached to the additional attachment device, and
   an additional watertight fabric that closes the other inner perimeter of the additional frame in a watertight manner.

3. The tail boom of claim 1, wherein the watertight fabric is bonded to the frame.

4. The tail boom of claim 1, wherein the frame further comprises:
   a first sandwich layer with the inner perimeter; and
   a second sandwich layer with the inner perimeter, wherein the watertight fabric is sandwiched between the first and second sandwich layers.

5. The tail boom of claim 1, wherein the frame further comprises:
   at least one extension for attaching auxiliary devices.

6. The tail boom of claim 5, wherein the auxiliary devices are selected from the group consisting of pipes, connectors, and harnesses.

7. The tail boom of claim 5, wherein the at least one extension further comprises:
   a plurality of perforations for accommodating the auxiliary devices.

8. The tail boom of claim 1, wherein the frame further comprises:
   at least one of a sheet metal or a composite material.

9. The tail boom of claim 1, wherein the frame is flat and has a uniform thickness.

10. The tail boom of claim 9, wherein the uniform thickness is between 0.5 mm and 1.5 mm.

11. The tail boom of claim 1, wherein the watertight fabric further comprises:
    one or more layers, at least one of the one or more layers comprising at least one of polyurethane laminate, thermoplastic polyurethane, polymer coated nylon, ripstop nylon, nylon taffeta, poly-vinyl chloride coated polyester, or para-aramid.

12. The tail boom of claim 1, wherein the watertight fabric has a first surface area and the frame has a second surface area, and wherein the first surface area is greater than the second surface area.

13. The tail boom of claim 12, wherein the watertight fabric further comprises:
an incision that is adapted to provide a flat bonding area of the watertight fabric at the frame without wrinkles and a baggy shaping out of the datum plane of the frame when water is pushing against the watertight fabric.

14. The tail boom of claim 13, wherein the watertight fabric further comprises:
a patch that closes the incision.

15. A helicopter comprising the tail boom of claim 1.

16. A tail boom for a helicopter, comprising:
a watertight compartment having a first end; and
a watertight bulkhead that closes the watertight compartment at the first end in a watertight manner, the watertight bulkhead comprising:
an attachment device attached to the watertight compartment at the first end,
a frame attached to the attachment device, and
a watertight fabric that closes the frame in a watertight manner.

17. The tail boom of claim 16, further comprising:
an additional watertight bulkhead that closes the watertight compartment at a second end of the watertight compartment in a watertight manner and comprises:
an additional attachment device that is attached to the watertight compartment at the second end,
an additional frame attached to the additional attachment device, and
an additional watertight fabric that closes the additional frame in a watertight manner.

18. The tail boom of claim 16, wherein the watertight fabric has a first surface area and the frame has a second surface area, and wherein the first surface area is greater than the second surface area.

19. The tail boom of claim 18, wherein the watertight fabric further comprises:
an incision that is adapted to provide a flat bonding area of the watertight fabric at the frame without wrinkles and a baggy shaping out of the datum plane of the frame when water is pushing against the watertight fabric.

20. A helicopter comprising:
a fuselage; and
a tail boom connected to the fuselage, the tail boom comprising:
a watertight compartment having a first end; and
a watertight bulkhead that closes the watertight compartment at the first end in a watertight manner, the watertight bulkhead comprising:
an attachment device attached to the watertight compartment at the first end,
a frame attached to the attachment device, and
a watertight fabric that closes the frame in a watertight manner.

* * * * *